United States Patent
Lau

(10) Patent No.: US 6,400,583 B1
(45) Date of Patent: Jun. 4, 2002

(54) FLYBACK CONVERTER WITH SYNCHRONOUS RECTIFYING

(75) Inventor: Chi-Sang Lau, Taipei (TW)

(73) Assignee: Hua-In Co., Ltd. (TW)

( * ) Notice: Subject to any disclaimer, the term of this patent is extended or adjusted under 35 U.S.C. 154(b) by 0 days.

(21) Appl. No.: 09/812,586

(22) Filed: Mar. 21, 2001

(51) Int. Cl.[7] ............................................. H02M 3/335
(52) U.S. Cl. .................. 363/21.13; 363/21.14
(58) Field of Search ........................ 363/21.12, 21.13, 363/21.14, 21.16

(56) References Cited

U.S. PATENT DOCUMENTS 5,745,358 A * 4/1998 Faulk ........................... 363/95

* cited by examiner

*Primary Examiner*—Shawn Riley
(74) *Attorney, Agent, or Firm*—Troxell Law Office PLLC

(57) ABSTRACT

A high efficiency flyback converter with synchronous rectifying, uses an equivalent-conducting resistor of a synchronous switch coupled with the synchronous rectifier to detect the secondary current of a transformer. Included is a logic circuit to control the duty cycle of the synchronous switch to avoid the vibration of the driving pulse. There is no inductance element, such as a current sensor, in the main power circuit loop, so that the power efficiency will be increased. The driving pulse signal drives the synchronous switch to turn on simultaneously with an output diode to reduce the component stress of the output diode, and to reduce the switching loss to promote the efficiency of the flyback converter power supply.

10 Claims, 5 Drawing Sheets

FLYBACK CONVERTER WITH SYNCHRONOUS RECTIFYING

BACKGROUND OF THE INVENTION

1. Field of the Invention

The present invention relates to a high efficiency flyback converter with synchronous rectifying to simplify the circuit design, and improve the power efficiency by using a conducting resistor of a synchronous switch to detect the secondary current of the transformer, and by using a logic circuit to control the duty cycle of the synchronous switch.

2. Background of the Invention

In modern times, the requirement of power supply is becoming more and more important since the electronic predictors have grown quickly. Herein, the techniques for the switching power supply has achieved more progress than the traditional power supply. Operating in coordination with the variation of the circuit topology, the switching power supply has been an essential technique in the field of the computer and electronic equipment power source. The switching power supply is a popular device because it provides the power source with the stability, compactness, efficiency and lower cost for computer, rather than the traditional linear transformer driver.

In the switching power supply area, the synchronous rectifying method has been in use for many years. Generally, the synchronous rectifying method is almost applied in the forward converter or the resonant converter. FIG. 1 is the prior art U.S. Pat. No. 5,991,171, and uses the synchronous rectifying technique. The synchronous rectifier control 122 is connected in the secondary circuit of a forward DC-to-DC converter, not in a flyback converter.

FIG. 2 is the prior art U.S. Pat. No. 5,991,172, and presents a flyback converter reducing the turn-on switching losses in a single stage by using a zero-crossing detector device to control the SW operation. Obviously, FIG. 2 does not use the synchronous rectifying technique in the flyback converter. The main disadvantage of U.S. Pat. No. 5,991,172 is that a more complex circuit designed to drive the SW. On the other hand, the zero-crossing detector device equipped for the primary circuit and the feedback signal was the divided voltage. The present invention would be very different from FIG. 2 by controlling the current feedback level and detecting the secondary current with synchronous rectifier in the flyback converter.

As mentioned above, it is obvious that the synchronous rectifier has never been applied to the flyback converter. The reason is that the characteristic of the flyback circuit is often interrupted by the parasitic capacitor and leaking inductor operation to make the current switching waveform more complex. The parasitic capacitor interruption hardly results in getting the synchronous control signal, so there is no use of the synchronous rectifier in the flyback converter. Further, some producers use much more complex controlling methods to control the switch for good performance. But the flyback switching power supply is used extensively for the consideration of low price and simple circuit design. We should not use the complex controlling methods in the flyback converter. This invention provides the flyback converter with a low cost and simplified circuit design.

SUMMARY OF THE INVENTION

The present invention relates to a high efficiency flyback converter with a synchronous rectifier by using an equivalent-conducting resistor to be a current sensor. The equivalent-conducting resistor is coupled with a synchronous rectifier to detect the secondary current of the transformer. Further, this invention applies a logic circuit coupled with the synchronous rectifier to control the pulse width and duty cycle of the driving pulse of synchronous switch to improve the efficiency of the flyback converter. The synchronous rectifier reduces the component stress of the diode coupled with the synchronous switch, and the pulse width of the output signal from the synchronous rectifier makes an output diode turn on synchronously with the synchronous switch.

The primary object of this invention is to provide a flyback converter that improves the power supply under low switching loss.

Another object of this invention is to provide a flyback converter that avoids the secondary current flow back.

Another object of this invention is to provide a flyback converter that simplifies the circuit design to make mass production much easier, so the circuit production can have cost lower than the traditional flyback converter.

Another object of this invention is to provide a flyback converter that can be operated in good performance for both continuous or discontinuous conducting modes.

Another object of this invention is to provide a flyback converter that reduces the component stress of the output diode.

In order to achieve the purposes described above, the flyback converter with synchronous rectifying in this invention comprises a power source which provides the power for the flyback converter. The power source is coupled to a flyback switch circuit for switching then outputting a high frequency pulse to a transformer. The transformer has a primary coil coupled to the flyback switch circuit to receive the high frequency pulse, and has two secondary coils—one a master source, and the other a sub-source. The sub-source is connected to a synchronous rectifier via a diode D1 and a fast charging/discharging path, then the diode D1 and the synchronous rectifier are coupled to a logic circuit to detect the output signal of the synchronous rectifier. Further, the logic circuit is coupled with a buffer to control the sequence driving pulse width and duty cycle for the synchronous switch. The synchronous switch is coupled with an output diode in parallel and is turned on simultaneously with the output diode. The output diode is placed between the master source and a load end, and the load further connects with an output capacitor in parallel.

One of the main distinguishing features in this invention is that there is no use of any current sensor. We apply an equivalent-conducting resistor of the synchronous switch to detect the load current then feedback a voltage to the synchronous rectifier for comparing with a preset voltage level to further regulate the driving pulse for the synchronous switch. Since the main power loop has no inductance element (as a current sensor), this invention makes the power supply have good performance.

In the preferred embodiment, the equivalent-conducting resistor detects the load current to make the synchronous rectifier, the logic circuit and the buffer output a regulated driving pulse when the output diode is on. The synchronous switch turns on with the output diode simultaneously to bypass the current direction of the output diode to reduce the component stress and switching loss of the synchronous switch.

BRIEF DESCRIPTION OF THE DRAWINGS

The foregoing features of the present invention may be more fully understood from the following detailed description, read in conjunction with the accompanying drawings, wherein.

DETAILED DESCRIPTION OF THE PREFERRED EMBODIMENT

This invention provides a high efficiency flyback converter with synchronous rectifying by using a synchronous rectifier and an equivalent-conducting resistor of a synchronous switch to detect the secondary current level of the transistor. Furthermore, there is a logic circuit used to control the duty cycle of the synchronous switch to avoid the vibration of the driving pulse. There is no inductance element, such as a current sensor, in the main power circuit loop, so that the power efficiency will have good performance. The driving pulse signal drives the synchronous switch to turn on simultaneously with the output diode to reduce the component stress of the output diode, and reduce the switching loss to promote the efficiency of the flyback converter power supply.

Figure 1:
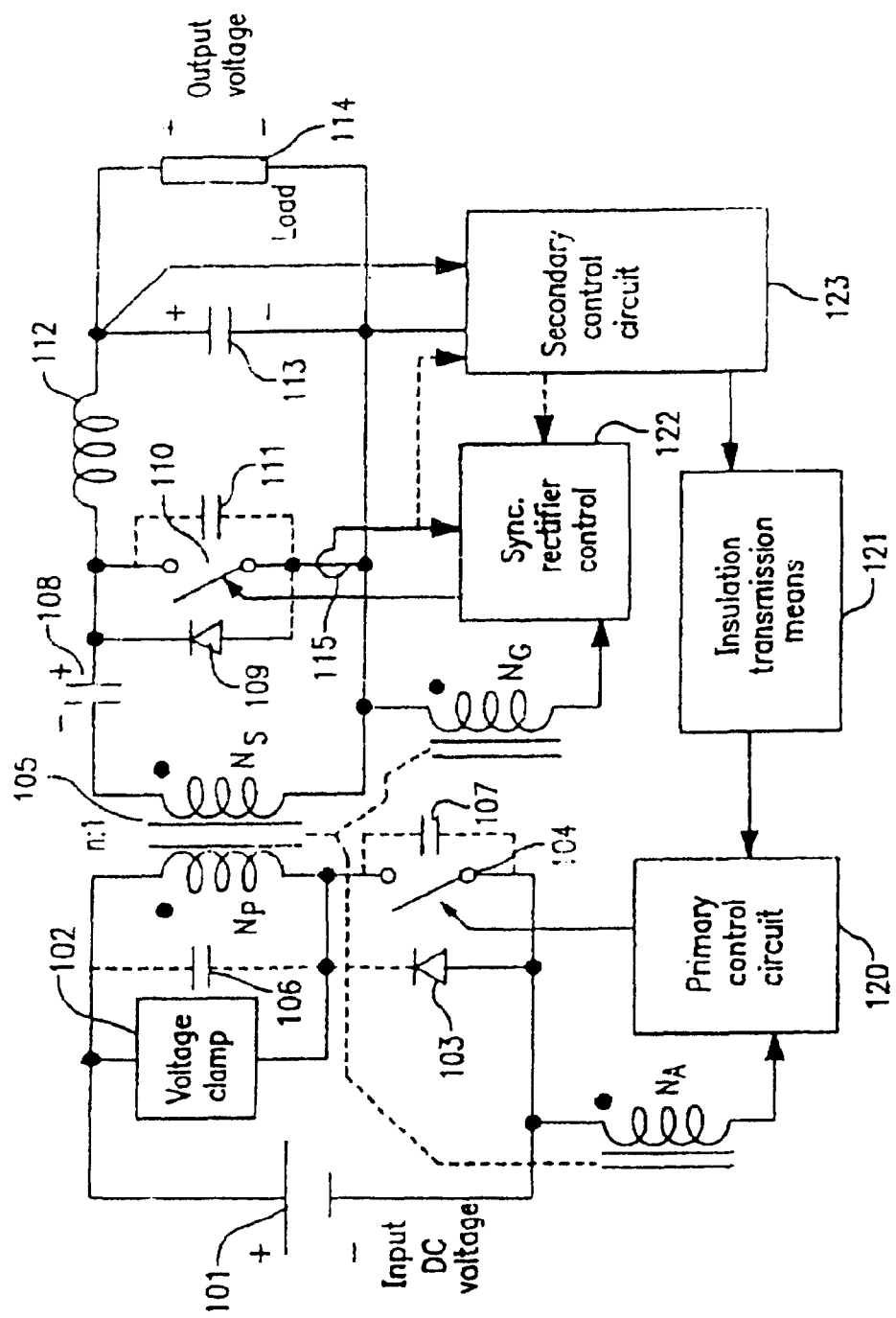
FIG. 1 is a schematic illustration of the prior art of a conventional forward DC-to-DC converter.
Figure 2:
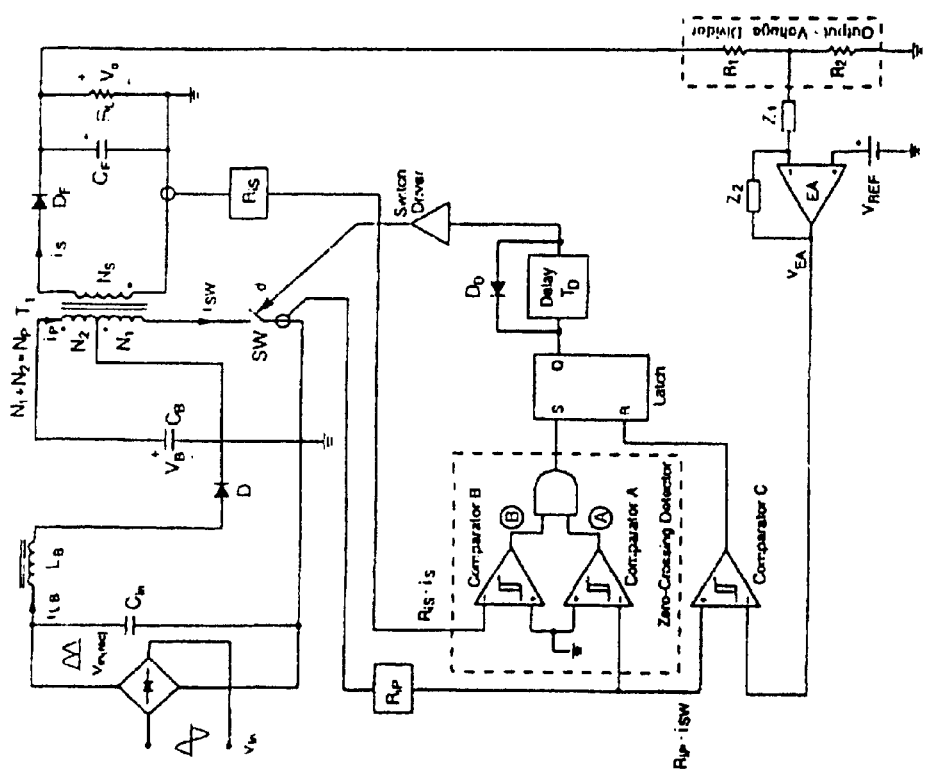
FIG. 2 is a schematic illustration of the prior art of the conventional flyback converter by using a zero-crossing detector device to control the SW operation.
Figure 3:
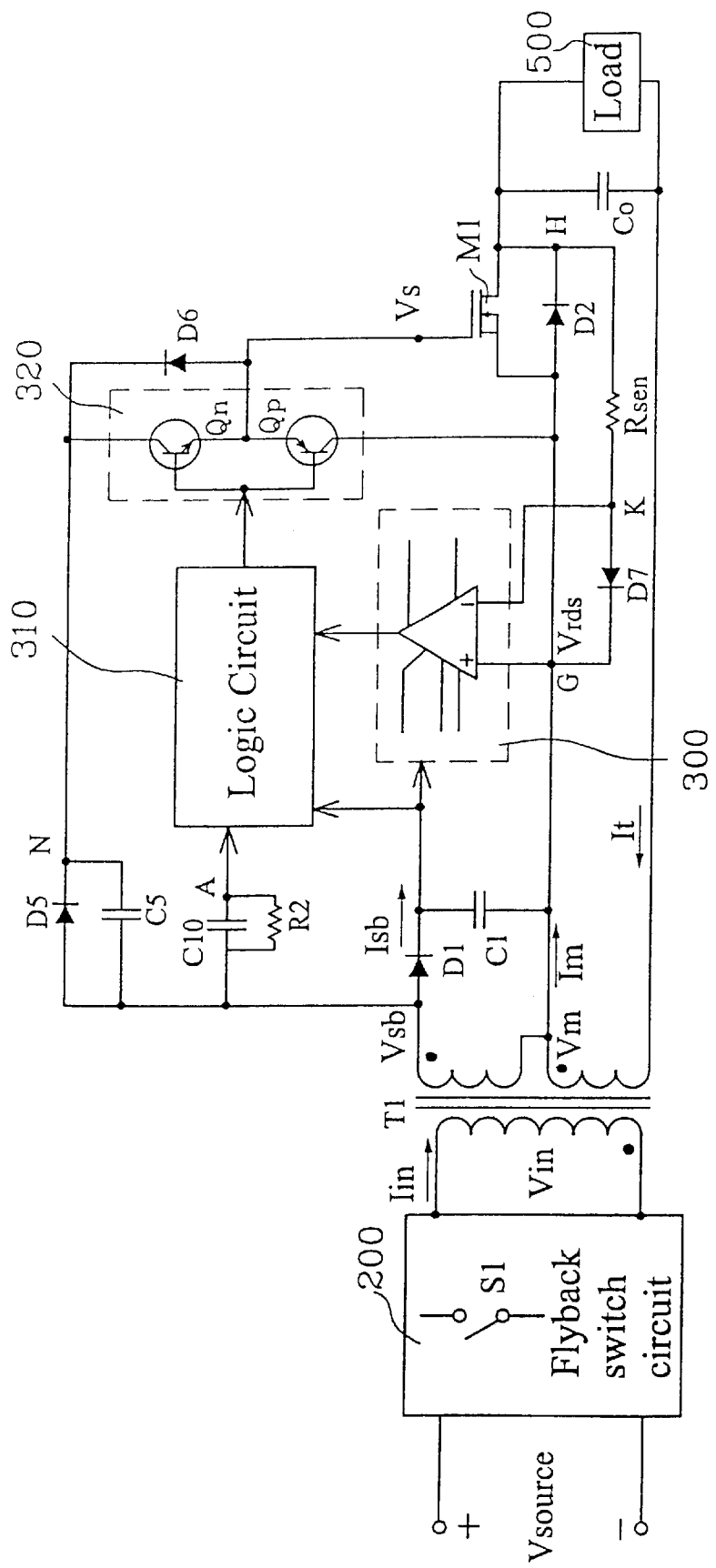
FIG. 3 is a schematic illustration of the embodiment according to the present invention.

The flyback converter with synchronous rectifying according to this invention is shown in FIG. 3. The flyback converter comprises a power source V source which provides the required power for the flyback converter, the V source comprising a DC source in a practical operation. The power source is coupled to a flyback switch circuit 200 for switching and outputting a high frequency pulse Vin (the current is Iin) to a transformer T1. The flyback switch circuit 200 includes a switch S1 to switch on/off with high frequency. In the basic flyback converter topology, the transformer T1 is the main transformer element to transfer the energy of the primary coil into the secondary coil. The transformer T1 has the primary coil coupled to the flyback switch circuit 200 to receive the high frequency pulse Vin. The transformer T1 has two secondary coils—one is a master source Vm (the current is Im, and the $I_t$ is the total current) and the other is a sub-source Vsb (the current is Isb). The secondary coil of transformer T1 uses the middle tap wiring method to complete the master source Vm and the sub-source Vsb.

In FIG. 3, the sub-source Vsb is connected to a synchronous rectifier 300 via a diode D1 to make the synchronous rectifier 300 output a signal connected to a logic circuit 310. In this embodiment, the synchronous rectifier 300 could be achieved by using a comparator IC 301. The logic circuit 310 has a first input coupled to the sub-source via a diode D1, a second input coupled to the sub-source via a capacitor C10 and R2 at note A, and a third input receiving the signal from the synchronous rectifier 300 to output a signal connected to a buffer 320. The buffer 320 comprises an N-type transistor Qn which is connected with a P-type transistor Qp. The buffer 320 is used to receive the signal from the logic circuit 310 and to output a sequence driving pulse Vs to drive a synchronous switch M1 be turned on simultaneously.

The main advantage of installing the buffer 320 is to enable the flyback power supply to have good performance in both the continuous conducting mode (CCM) and discontinuous conducting mode (DCM). The synchronous switch M1 further connects with an output diode D2 and receives the sequence driving pulse from the buffer 320, then is turned on simultaneously with the output diode D2. When the synchronous switch M1 is turned on with the output diode D2 simultaneously, the current of output diode D2 will be bypassed so as to reduce the component stress and switching loss. Then the drain pole of M1 and the N pole of D2 connect to a load 500.

There is also included a fast charging/discharging path coupled between said sub-source Vsb and the gate electrode of the synchronous switch M1 in FIG. 3. The fast charging/discharging path includes a quickly turned on diode D5 which is connected with a quickly turn off diode D6. The quickly turned on diode D5 is also coupled with a capacitor C5 in parallel connection. The fast charging path comprises the diode D5, the capacitor C5, the Qn and the gate of the M1. It is used to form a quickly charging circuit for the synchronous switch M1 to turn on quickly. On the other hand, the fast discharging path comprising the diode D6 and the capacitor C5. It is used to form a quickly discharging circuit for the synchronous switch M1 to turn off quickly. In the fast charging/discharging path, the node N, between D5 and D6, is connected with the collector electrode of Qn of the buffer 320. Both the base electrodes of the Qn and Qp of the buffer 320 are connected together, then coupled to the output of the logic circuit 310. Both the emitter electrodes of the Qn and Qp are also connected together and then coupled to the gate electrode of synchronous switch M1. The collector electrode of Qn of the buffer 320 is coupled to the node N to connect with the fast charging/discharging path, and the collector electrode of Qp is coupled to the Vm.

In the preferred embodiment, the internal equivalent-conducting resistor $r_{ds}$ (not shown in FIG. 3) of the synchronous switch M1 detects the current of the load 500 to enable the synchronous rectifier 300. Using the $r_{ds}$ to replace the CP or Hall element will simplify the circuit design and lower costs for the flyback power supply. There is a coupling resistor Rsen connected between node K and H to couple the voltage (Vrds in node G) of the $r_{ds}$ into the synchronous rectifier 300. The resistor $r_{ds}$ of the synchronous switch M1 connects with the load 500 in series connection to detect the load current, then the Rsen transmits the voltage of $r_{ds}$ into the synchronous rectifier 300 for comparing with a preset current level Ib (shown in FIG. 4). The diode D7 is a protection device to avoid damage to the comparator IC. The logic circuit 310 receives the signal from the synchronous rectifier 300 to further regulate the sequence driving pulse Vs to eliminate the vibration. That is, the logic circuit 310 receives the detecting signal from the synchronous rectifier 300 to judge and make sure that the feedback signal of conducting forward voltage of D2 is not able to make the M1 turn on.

From the buffer 320, the sequence driving pulse Vs drives the synchronous switch M1 to be turned on simultaneously with the output diode D2. According to the embodiment of this invention, the synchronous switch M1 is accomplished by using a MOSFET. The output diode D2 is placed between the master source Vm and the load 500. The load 500 further connects with an output capacitor Co in parallel.

Figure 4:
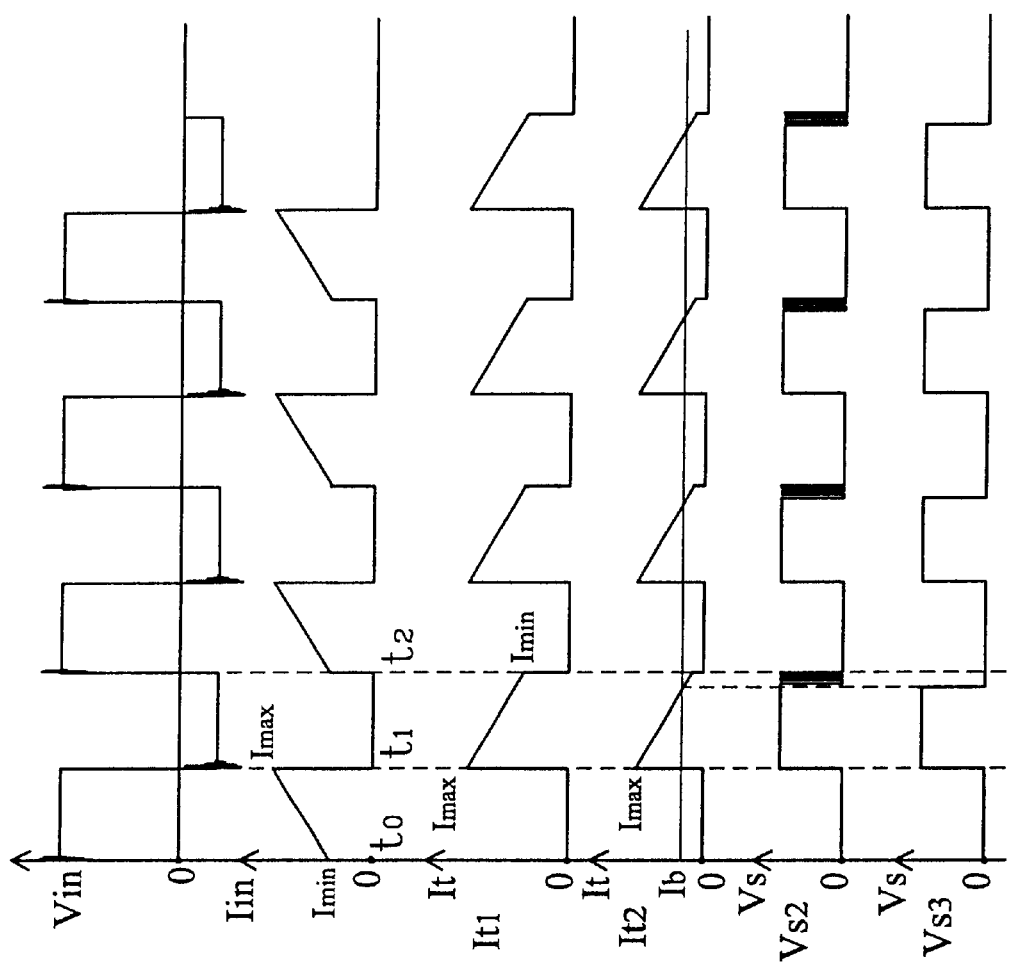
FIG. 4 is a schematic illustration of the waveforms of the main elements in FIG. 3 according to the embodiment in the present invention.

FIG. 4 is a schematic illustration of the waveforms corresponding to the main elements in FIG. 3 according to the present invention. Vin is the input voltage of T1, Iin is the input current of the primary coil of T1, and a It is the total current of the secondary coil of T1. $It_1$ is operated in a continuous conducting mode (CCM) or in the large current range situation. In another way, the $It_2$ is operated in a discontinuous conducting mode (DCM) or in the small current range situation. In the CCM, Iin is rising from the Imin since the $t+t_0$, Vin is in high level, $It_1=0$ and the primary coil is storing the energy from Vsource. Until $t=t_1$, the primary coil of T1 is in an open loop state, T1 transmits the energy from the primary to the secondary coil, and $It_1$=Imax. Hereinafter, $It_1$ when $It_1$=Imin until $t_2$ alternately, then a switching cycle is formed form $t_0=t_2$.

The $It_1$ is into the synchronous switch M1 during $t=t_1$ to $t_2$, the synchronous rectifier 300 and the logic circuit 310 do not turn on the synchronous switch M1. The main current $I_{r1}$ flows through the output diode D2 then into the load 500, and results in a forward voltage about 0.5V~1.2V on D2. The equivalent-conducting resistor senses the forward voltage and transmits into the synchronous rectifier 300 for comparing with a preset level. The positive and negative input of the comparator 301 are coupled to the source and drain electrodes of M1 via the Rsen, so that the forward voltage of D2 can be sensed and transmitted into the comparator 301 to detect if the value is higher or not. Meanwhile, the input impedance of the comparator 301 is larger than Rsen, so that the voltage between nodes g and H is able to represent exactly into the comparator 301.

To make the signals from the synchronous rectifier 300 more correct, this embodiment uses the prompt capacitor Cs to catch the voltage of D2. At t–t1, the comparator 301 outputs a high level voltage into the logic circuit 310 and further into the buffer 320, while It is higher than Ib, and produces the sequence driving pulse Vs to turn on the M1. Meantime, the M1 is changed from high impedance to low impedance between the drain and source ends. The equivalent conducting resistor rds is down from Ω to mΩ level, and the voltage on the D2 is reduced. There is still a small voltage Vrds resulting from the rds of the internal resistor of M1. The preset Ib level has a small value, and the voltage corresponding with the Ib can be compared with the voltage Vrds although the Vrds is small while the Vs is in a high level. After t2, the primary coil of T1 is into a charging state, Vs is zero alternately, and a switch cycle is completed.

We must emphasize that the total current It (or It1) in the master source loop with the equivalent conducting resistor current detecting is very different from using a CT or Hall element. The master source loop has no any barrier element (likes an inductance) to reduce the power factor. This will enable the flyback converter of this invention to reduce the power consumption and interference, and to have good performance.

When the flyback converter of this invention is operated in the DCM, or the It2 is operated in a small current range, the waveform of It2 is similar to a triangle. The triangle current waveform could be smaller than the Ib, at that time, the comparator 301 of the synchronous rectifier 300 outputs a low level signal to the logic circuit 310 to judge the signal corresponding to the small level of It2. If there is no logic circuit 310 application, and the synchronous rectifier 300 would output a low-level signal to the buffer 320 to turn off the M1 directly, then current It2 will flow through the output diode D2 due to M1 being open. Meanwhile, when the forward voltage of D2 is higher than the voltage produced by the preset level Ib through the resistor Rsen, then the comparator 301 outputs a high level signal to make the synchronous switch M1 turn on alternately. The voltage Vrds will be smaller again and results in the comparator 301 outputting a low-level signal to turn off M1. The synchronous switch M1 will be turned on and off repeatedly, and that is the vibration performance of Vs2 shown in FIG. 4.

The vibration phenomenon of Vs will result in wrong switching operation and increase the power consumption of the flyback power supply. In order to eliminate the vibration of driving pulse Vs, this invention employs the logic circuit 310 to take a judgment to ensure that the forward voltage of D2 will not turn on M1. The waveform Vs3 in FIG. 4 shows the driving pulse Vs eliminates the vibration using the logic circuit 310. The detail circuitry of logic circuit 310 will be described as follows in FIG. 5.

Figure 5:
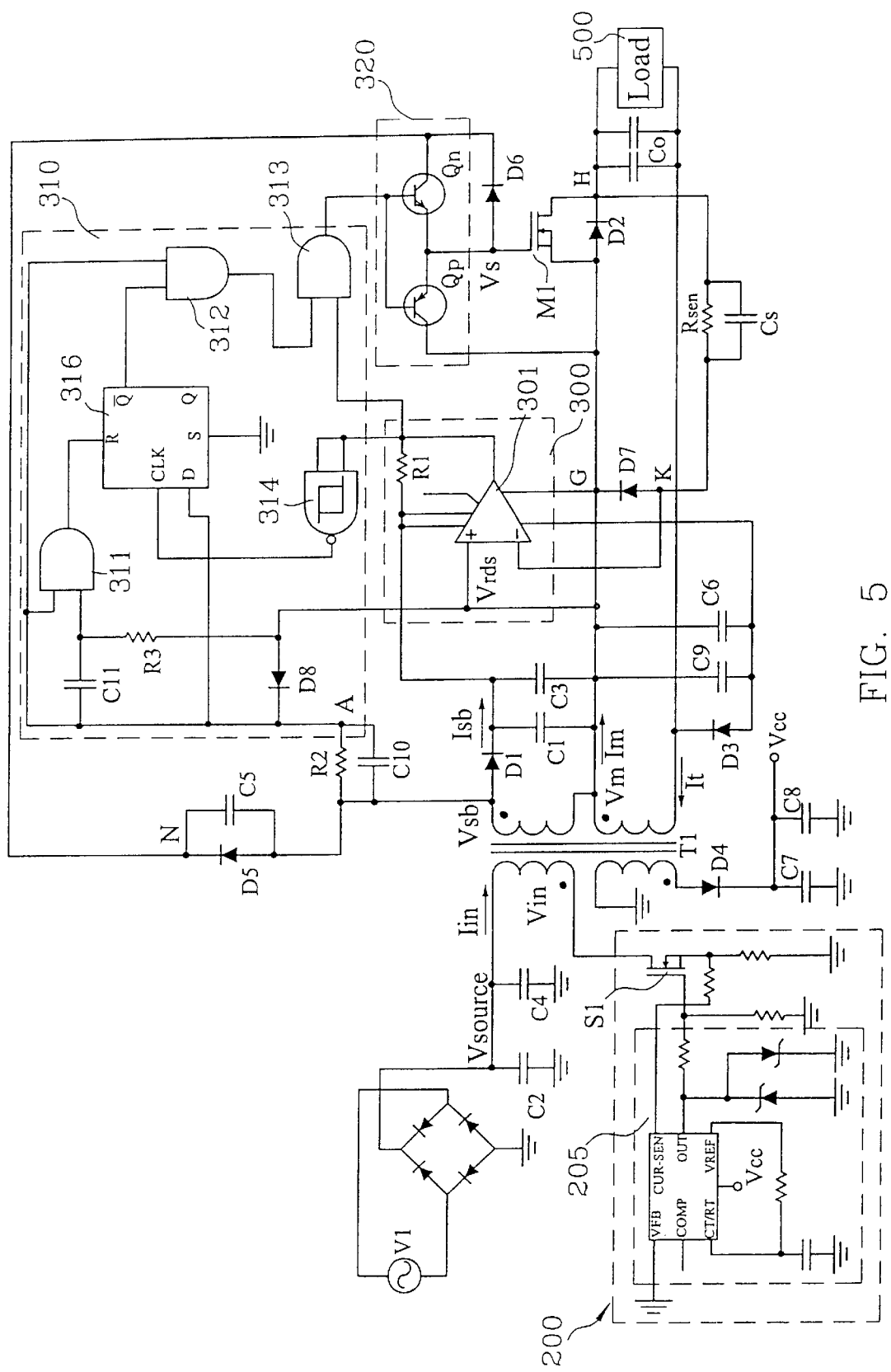
FIG. 5 is a detailed schematic illustration of the circuit elements corresponding to FIG. 3 according to the present invention.

In order to describe the circuitry in more detail for the embodiment of this invention, please refer to FIG. 5 which is a detailed schematic illustration of the circuit element connections. The Vsource is from the output of bridge rectifier that rectifies the utility power, like AC 110V or 220V. There is a gate control circuit 205 that controls the switch S1 of the flyback switch circuit 200. For example, the gate control circuit 205 can be a gate control IC such as MC3844A. The synchronous switch 300 can be a comparator IC such as the LM311 chip. The logic circuit 310 consists of a D-type flip-flop 316 which coupled with the AND gates 311, 312 and a NAND gate 314. The D input of the D flip-flop 316 is coupled to the node A and to the sub-source Vsb via the resistor R2 and capacitor C10. One input of the AND gate 312 is coupled to the node A, and the output of AND gate 312 is coupled to another one AND gate 313. The output of the AND gate 313 is coupled to the buffer 320 to output the sequence driving pulse Vs. By using the D flip-flop 316, the logic circuit 310 will not output a high level signal to turn on the synchronous switch M1 when the synchronous switch M1 is just turned off. Although the It2 flows through the diode D2 to form a forward voltage higher than the voltage made by the preset Ib through the Rsen, the D flip-flop 316 can make the logic circuit 310 keep the pre-state voltage made from the It2 via the D2 to compare with the next state voltage. As mentioned above, the vibration phenomenon of Vs would be eliminated so as to switch the M1 exactly by the logic circuit 310 of this invention. The logic circuit and synchronous circuit can be integrated into a single IC to keep the cost down and to make the converter smaller.

On the other hand, in order to make sure that the embodiment of this invention has good performance, the inventor has taken an experiment for a real flyback converter power supply under 12V and 60W output power practically. The experimental result is to increase the power efficiency from 81% to 92% by applying the circuitry of this invention.

While this invention has been described in connection with what is presently considered to be the most practical and preferred embodiment, it is to be understood that the invention is not limited to the disclosed embodiments, but on the contrary, it is intended to cover various modifications and equivalent arrangements included within the spirit and scope of the appended claims.

I claim:

1. A flyback converter with synchronous rectifying, comprising:
   a power source;
   a flyback switch circuit coupled to said power source to output a high frequency pulse;
   a transformer having a primary coil coupled to said flyback switch circuit to receive said high frequency pulse, the transformer having two secondary coils including a master source and a sub-source;
   a synchronous switch connected with a first diode and receiving a sequence driving pulse, the synchronous switch turned on simultaneously with said output diode, and connected to a load, the synchronous switch including an equivalent conducting resistance;

a synchronous rectifier coupled to said sub-source, and coupled with the equivalent conducting resistor of said synchronous switch to output a signal;

a logic circuit coupled to said sub-source via a second diode and a capacitor, and receiving said signal from said synchronous rectifier to output a signal to avoid vibration of said sequence driving pulse;

a fast charging/discharging path coupled between said sub-source and a gate electrode of said synchronous switch; and, a buffer coupled between said fast charging/discharging path and said master source, and receiving said signal from said logic circuit to output said sequence driving pulse to drive said synchronous switch to be turned on simultaneously;

wherein, said equivalent conducting resistor of said synchronous switch detects the current of said load to enable said synchronous rectifier, said logic circuit and said buffer to sequentially output said sequence driving pulse for said synchronous switch.

2. The flyback converter with synchronous rectifying of claim 1, wherein said fast charging/discharging path comprises a quickly turned on diode D5 connected with a quickly turned off diode D6, wherein said quickly turned on diode D5 is coupled with a capacitor C5 in parallel connection.

3. The flyback converter with synchronous rectifying of claim 1, wherein said buffer comprises an N-type transistor Qn connected with a P-type transistor Qp.

4. The flyback converter with synchronous rectifying of claim 1, further comprising a coupling resistor to couple the voltage of the equivalent-conducting resistor of said synchronous switch into the synchronous rectifier.

5. The flyback converter with synchronous rectifying of claim 1, wherein said output diode is coupled to said master source via a P pole of said output diode, and an N pole of the output diode is coupled to said load.

6. The flyback converter with synchronous rectifying of claim 1, wherein said synchronous rectifier is coupled with the equivalent conducting resistor of said synchronous switch to transmit a load current into said synchronous rectifier for comparison with a preset current level to regulate the sequence driving pulse.

7. The flyback converter with synchronous rectifying of claim 1, wherein said secondary coil of the transformer comprises the master source and the sub-source.

8. The flyback converter with synchronous rectifying of claim 1, wherein said synchronous rectifier comprises a comparator IC.

9. The flyback converter with synchronous rectifying of claim 1, wherein said synchronous switch comprises an N-type MOSFET.

10. The flyback converter with synchronous rectifying of claim 3, wherein: base electrodes of said Qn and Qp are connected together and coupled to the output of said synchronous rectifier; both emitter electrodes of said Qn and Qp are connected together and coupled to a gate electrode of said synchronous switch; a collector electrode of said Qn is coupled with said fast charging/discharging path; and a collector electrode of said Qp is coupled to said master source.

* * * * *